United States Patent
Smith et al.

(10) Patent No.: US 10,339,068 B2
(45) Date of Patent: Jul. 2, 2019

(54) FULLY VIRTUALIZED TLBS

(71) Applicants: Advanced Mirco Devices, Inc., Sunnyvale, CA (US); ATI Technologies ULC, Markham (CA)

(72) Inventors: Wade K. Smith, Sunnyvale, CA (US); Anthony Asaro, Toronto (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 15/495,707

(22) Filed: Apr. 24, 2017

(65) Prior Publication Data

US 2018/0307622 A1 Oct. 25, 2018

(51) Int. Cl.
| | | |
|---|---|---|
| G06F 12/1045 | (2016.01) | |
| G06F 12/1027 | (2016.01) | |
| G06F 12/1009 | (2016.01) | |

(52) U.S. Cl.
CPC ...... *G06F 12/1063* (2013.01); *G06F 12/1009* (2013.01); *G06F 12/1027* (2013.01); *G06F 2212/65* (2013.01); *G06F 2212/68* (2013.01)

(58) Field of Classification Search
CPC ............. G06F 12/1063; G06F 12/1027; G06F 12/1009; G06F 2212/68; G06F 2212/65
See application file for complete search history.

(56) References Cited

U.S. PATENT DOCUMENTS

| | | | |
|---|---|---|---|
| 5,454,091 A | 9/1995 | Sites et al. | |
| 5,526,504 A | 6/1996 | Hsu et al. | |
| 5,752,275 A | 5/1998 | Hammond | |
| 5,907,867 A | 5/1999 | Shinbo et al. | |
| 6,112,285 A | 8/2000 | Ganapathy et al. | |
| 6,567,900 B1 | 5/2003 | Kessler et al. | |
| 6,826,670 B2 | 11/2004 | Middleton et al. | |
| 7,389,402 B2 | 6/2008 | Zuraski, Jr. et al. | |
| 7,437,529 B2 | 10/2008 | Burugula et al. | |

(Continued)

OTHER PUBLICATIONS

Yoon et al, "Adaptive Granularity Memory Systems: A Tradeoff between Storage Efficiency and Throughput", 2011 Symposium on Computer Architecture (ISCA '11 ), Jun. 4-8, 2011, San Jose, California, pp. 295-306.

(Continued)

*Primary Examiner* — Larry T Mackall
(74) *Attorney, Agent, or Firm* — Meyertons Hood Kivlin Kowert and Goetzel PC; Rory D. Rankin

(57) ABSTRACT

Systems, apparatuses, and methods for implementing a virtualized translation lookaside buffer (TLB) are disclosed herein. In one embodiment, a system includes at least an execution unit and a first TLB. The system supports the execution of a plurality of virtual machines in a virtualization environment. The system detects a translation request generated by a first virtual machine with a first virtual memory identifier (VMID). The translation request is conveyed from the execution unit to the first TLB. The first TLB performs a lookup of its cache using at least a portion of a first virtual address and the first VMID. If the lookup misses in the cache, the first TLB allocates an entry which is addressable by the first virtual address and the first VMID, and the first TLB sends the translation request with the first VMID to a second TLB.

17 Claims, 6 Drawing Sheets

(56) References Cited

U.S. PATENT DOCUMENTS

| | | |
|---|---|---|
| 7,747,838 B2 | 6/2010 | Hepkin et al. |
| 7,793,070 B2 | 9/2010 | Stecher |
| 7,805,587 B1 | 9/2010 | Van Dyke et al. |
| 7,873,792 B2 | 1/2011 | Anand et al. |
| 8,195,917 B2 | 6/2012 | Hohmuth et al. |
| 8,429,377 B2 | 4/2013 | Chen et al. |
| 2002/0133685 A1 | 9/2002 | Kalyanasundharam |
| 2003/0014609 A1 | 1/2003 | Kissell |
| 2004/0117594 A1 | 6/2004 | Vanderspek et al. |
| 2005/0021925 A1 | 1/2005 | Clark et al. |
| 2006/0069899 A1 | 3/2006 | Schoinas et al. |
| 2006/0075146 A1 | 4/2006 | Schoinas et al. |
| 2006/0161758 A1 | 7/2006 | Bradford et al. |
| 2006/0174053 A1 | 8/2006 | Anderson et al. |
| 2006/0206686 A1 | 9/2006 | Banerjee et al. |
| 2007/0067604 A1 | 3/2007 | Elnozahy et al. |
| 2007/0180215 A1 | 8/2007 | Cascaval et al. |
| 2008/0086729 A1* | 4/2008 | Kondoh ............... G06F 9/5077 718/1 |
| 2008/0288742 A1 | 11/2008 | Hepkin et al. |
| 2009/0013149 A1 | 1/2009 | Uhlig et al. |
| 2009/0019254 A1 | 1/2009 | Stecher |
| 2009/0150624 A1 | 6/2009 | Resnick et al. |
| 2009/0172344 A1 | 7/2009 | Grochowski et al. |
| 2009/0187729 A1* | 7/2009 | Serebrin ............... G06F 9/455 711/206 |
| 2010/0332775 A1 | 12/2010 | Kapil et al. |
| 2011/0055458 A1 | 3/2011 | Kuehne |
| 2011/0138149 A1* | 6/2011 | Karlsson ............. G06F 12/1027 711/207 |
| 2012/0059983 A1 | 3/2012 | Nellans et al. |
| 2013/0036273 A1 | 2/2013 | Shaeffer |
| 2013/0238874 A1 | 9/2013 | Avudaiyappan et al. |
| 2013/0238875 A1 | 9/2013 | Ramaraju et al. |
| 2014/0282506 A1* | 9/2014 | Cadigan, Jr. ............... G06F 9/54 718/1 |
| 2015/0254189 A1* | 9/2015 | Coppola ............. G06F 12/145 711/163 |
| 2016/0048327 A1 | 2/2016 | Jayasena et al. |
| 2018/0046583 A1 | 2/2018 | Bybell et al. |
| 2018/0074715 A1 | 3/2018 | Farmahini-Farahani et al. |
| 2018/0232316 A1 | 8/2018 | Mirza et al. |
| 2018/0246814 A1 | 8/2018 | Jayasena et al. |

OTHER PUBLICATIONS

Frigo, et al., "FFTW: An Adaptive Software Architecture for the FFT", Proceedings of the 1998 IEEE International Conference on Acoustics, Speech and Signal Processing, May 15, 1998, 4 pages.

Volos, et al., "BuMP: Bulk Memory Access Prediction and Streaming", in Proceedings of the 47th Annual IEEE/ACM International Symposium on Microarchitecture, Dec. 13-17, 2014, 13 pages.

Kaseridis, et al., "Minimalist Open-page: A DRAM page-mode Scheduling Policy for the Many-core Era", Proceedings of the 44th Annual IEEE/ACM International Symposium on Microarchitecture, Dec. 3-7, 2011, 12 pages, ACM, New York, NY, USA.

Awasthi, et al., "Prediction Based DRAM Row-Buffer Management in the Many-Core Era", International Conference on Parallel Architectures and Compilation Techniques, Oct. 10-14, 2011, 2 pages.

Erlingsson, et al., "A Cool and Practical Alternative to Traditional Hash Tables", Proc. 7th Workshop on Distributed Data and Structures (WDAS'06), Jan. 2006, 6 pages.

International Search Report and Written Opinion in International Application No. PCT/US10/40625, dated Aug. 30, 2010, 8 pages.

Lim et al, "Disaggregated Memory for Expansion and Sharing in Blade Servers", Proceedings of the 36th Annual International Symposium on Computer Architecture, Jun. 29, pp. 267-278, https://web.eecs.umich.edu/~twenisch/papers/isca09-disaggregate.pdf. [Retrieved Jun. 22, 2018].

Non-Final Office Action in U.S. Appl. No. 15/441,532, dated Mar. 22, 2018, 18 pages.

International Search Report and Written Opinion in International Application No. PCT/US2006/019942, dated Feb. 2, 2007, 11 pages.

Austin et al., "High-Bandwidth Address Translation for Multiple-Issue Processors", Proceedings of the 23rd Annual Symposium on Computer Architecture, May 15, 1996, pp. 158-167.

\* cited by examiner ated processing unit (APU).# FULLY VIRTUALIZED TLBS

BACKGROUND

Description of the Related Art

Many computing devices use a virtual memory technique for handling data accesses by software programs. A virtual memory page-translation mechanism enables system software to create separate address spaces for each process or application. These address spaces are known as virtual address spaces. The system software uses the paging mechanism to selectively map individual pages of physical memory into the virtual address space using a set of hierarchical address-translation tables known collectively as page tables. Virtual memory can be implemented with any processor, including, but not limited to, a central processing unit (CPU), a graphics processing unit (GPU), and an accelerated processing unit (APU).

When data is accessed by a program, a block of memory of a given size (e.g., 4 kilobytes (KB)) that includes the data, called a "page" of memory, is copied from backing storage (e.g., a disk drive or semiconductor memory) to an available physical location in a main memory in the computing device. Some systems have multiple different page sizes stored in memory. Rather than having programs manage the physical locations of the pages, a memory management unit in the computing device manages the physical locations of the pages. Instead of using addresses based on the physical locations of pages (or "physical addresses") for accessing memory, the programs access memory using virtual addresses in virtual address spaces. From a program's perspective, virtual addresses indicate the actual physical addresses (i.e., physical locations) where data is stored within the pages in memory and hence memory accesses are made by programs using the virtual addresses. However, the virtual addresses do not directly map to the physical addresses of the physical locations where data is stored. Thus, as part of managing the physical locations of pages, the memory management unit translates the virtual addresses used by the programs into the physical addresses where the data is actually located. The translated physical addresses are then used to perform the memory accesses for the programs. To perform the above-described translations, the memory management unit uses page tables in memory that include a set of translations from virtual addresses to physical addresses for pages stored in the memory. However, when a system uses multiple different page sizes, managing translations in an efficient and flexible manner can be challenging.

For computing systems that support virtualization (e.g., virtual machines), multiple different virtual machines share the physical resources of the computing system. Typically, a large amount of state is stored in the page tables and translation lookaside buffers (TLBs) for a given virtual machine executing on the computing system. Accordingly, swapping out the contents of the TLBs each time a virtual machine exits and a new virtual machine starts executing can be a drag on performance.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a fully virtualized translation lookaside buffer (TLB) are disclosed herein. In one embodiment, a system includes at least one execution unit and a first TLB, wherein the first TLB comprises a plurality of entries storing virtual-to-physical address translations. In one embodiment, the system is configured to support a virtualization environment. Accordingly, a plurality of virtual machines can execute on the system.

In one embodiment, the system detects a translation request generated by a first virtual machine with a first virtual memory identifier (VMID). The system conveys the translation request from an execution unit to the first TLB. In various embodiments, at least a portion of the first virtual address and the first VMID are used to perform a lookup of the TLB. In another embodiment, the translation request also includes a first virtual function identifier (VFID) and the first TLB also utilizes the first VFID to perform the lookup.

In one embodiment, the first TLB is configured to retrieve a first translation from a first entry responsive to determining that the first entry is a match to the lookup with at least the portion of the first virtual address and the first VMID. The first TLB is configured to convey the first virtual address, the first VMID, and the first VFID to a second TLB responsive to determining the lookup missed in the first TLB. The first TLB is also configured to allocate an entry for the first virtual address, where a location of the entry in the first TLB is determined by at least the first VMID. The second TLB is configured to perform a lookup utilizing at least the portion of the first virtual address, the first VMID, and the first VFID. If the lookup of the second TLB results in a miss, the second TLB is configured to convey the first virtual address, the first VMID, and the first VFID to the page table walker. The page table walker is configured to utilize the first virtual address, the first VMID, and the first VFID to locate a matching physical address.

Figure 1:
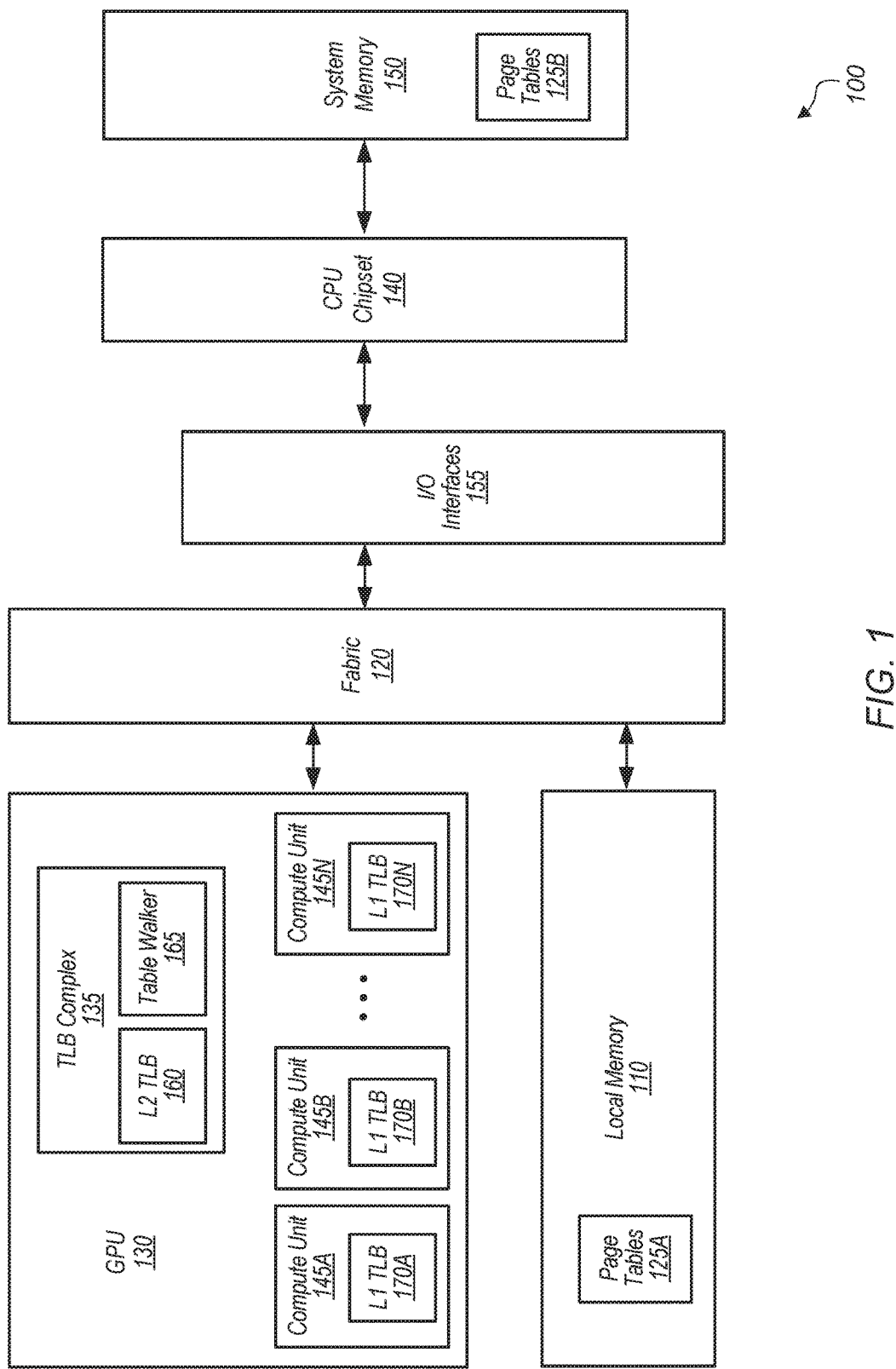
FIG. 1 is a block diagram of one embodiment of a computing system.

Referring now to FIG. 1, a block diagram of one embodiment of a computing system 100 is shown. In one embodiment, computing system 100 includes a system memory 150, input/output (I/O) interfaces 155, fabric 120, graphics processing unit (GPU) 130, local memory 110, and CPU Chipset 140. System 100 can also include other components not shown in FIG. 1 to avoid obscuring the figure. In another embodiment, GPU 130 can be another type of processing unit (e.g., central processing unit (CPU), application specific integrated circuit (ASIC), field programmable gate array (FPGA), digital signal processor (DSP)).

GPU 130 includes at least translation lookaside buffer (TLB) complex 135 and compute units 145A-N which are representative of any number and type of compute units that are used for graphics or general-purpose processing. Each compute unit 145A-N includes any number of execution units, with the number of execution units varying from embodiment to embodiment. GPU 130 is coupled to local memory 110 via fabric 120. In one embodiment, local memory 110 is implemented using high-bandwidth memory (HBM). In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, GPU 130 uses TLBs to store mappings of virtual addresses to physical addresses for the virtual addresses that are allocated to different processes executing on GPU 130. These TLBs are shown as L1 TLBs 170A-N in compute units 145A-N, respectively, and L2 TLB 160 in TLB complex 135. TLB complex 135 also includes table walker 165. Generally speaking, a memory management unit can include one or more TLBs, table walking logic, fault handlers, and other circuitry depending on the implementation. In some embodiments, different TLBs can be implemented within GPU 130 for instructions and data. For example, a relatively small and fast L1 TLB is backed up by a larger L2 TLB that requires more cycles to perform a lookup. The lookup performed by an L2 TLB is relatively fast compared to a table walk to page tables 125A-B. Depending on the embodiment, page tables 125A-B can be located in local memory 110, system memory 150, or portions of page tables 125A-B can be located in local memory 110 and system memory 150. Some embodiments of a TLB complex include an instruction TLB (ITLB), a level one data TLB (L1 DTLB), and a level two data TLB (L2 DTLB). Other embodiments of a TLB complex can include other configurations and/or levels of TLBs.

In one embodiment, an address translation for a load instruction or store instruction in GPU 130 is performed by posting a request for a virtual address translation to the L1 TLB. The L1 TLB returns the physical address if the virtual address is found in an entry of the L1 TLB. If the request for the virtual address translation misses in the L1 TLB, then the request is posted to the L2 TLB. If the request for the virtual address translation misses in the L2 TLB, then a page table walk is performed for the request. A page table walk can result in one or more lookups to the page table structure (i.e., page tables 125A-B).

In one embodiment, GPU 130 is configured to perform a lookup of the TLBs for a first translation request using a first virtual address, first virtual memory identifier (VMID), and first virtual function identifier (VFID). If the lookup results in a miss, the TLB is configured to allocate an entry for the given translation request, where the entry is addressable by the first virtual address, first VMID, and first VFID. Also, if the lookup results in a miss, the L1 TLB is configured to convey the first translation request and the first VMID and first VFID to the L2 TLB 160. If the request misses in the L2 TLB 160, the L2 TLB 160 is configured to convey the first translation request and the first VMID and first VFID to the table walker 165. Table walker 165 is configured identify a particular page table register based on the first VMID and then retrieve a page directory address from the identified page table register. Next, table walker 165 performs a table walk starting at the retrieved page directory address.

I/O interfaces 155 are coupled to fabric 120, and I/O interfaces 155 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). GPU 130 is coupled to system memory 150, which includes one or more memory modules. Each of the memory modules includes one or more memory devices mounted thereon. In some embodiments, system memory 150 includes one or more memory devices mounted on a motherboard or other carrier upon which GPU 130 and/or other components are also mounted. In one embodiment, system memory 150 is used to implement a random access memory (RAM) for use with GPU 130 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement system memory 150 includes (but is not limited to) double data rate (DDR) DRAM, DDR2 DRAM, DDR3 DRAM, and so forth.

It is noted that the combination of local memory 110 and system memory 150 can be referred to herein as a "memory subsystem". Alternatively, either local memory 110 or system memory 150 can be referred herein as a "memory subsystem". Additionally, as used herein, the term "page" is defined as a fixed-length contiguous block of virtual memory. A "page" is also defined as a unit of data utilized for memory management by system 100. The size of a page can vary from embodiment to embodiment, and multiple different page sizes can be utilized in a single embodiment. It should be understood that the terms "memory page" and "page" are intended to represent any size of memory region.

In various embodiments, computing system 100 can be a computer, laptop, mobile device, server or any of various other types of computing systems or devices. It is noted that the number of components of computing system 100 and/or GPU 130 can vary from embodiment to embodiment. There can be more or fewer of each component/subcomponent than the number shown in FIG. 1. It is also noted that computing system 100 and/or GPU 130 can include other components not shown in FIG. 1. For example, in another embodiment, GPU 130 can represent a multicore processor. Additionally, in other embodiments, computing system 100 and GPU 130 can be structured in other ways than shown in FIG. 1.

Figure 2:
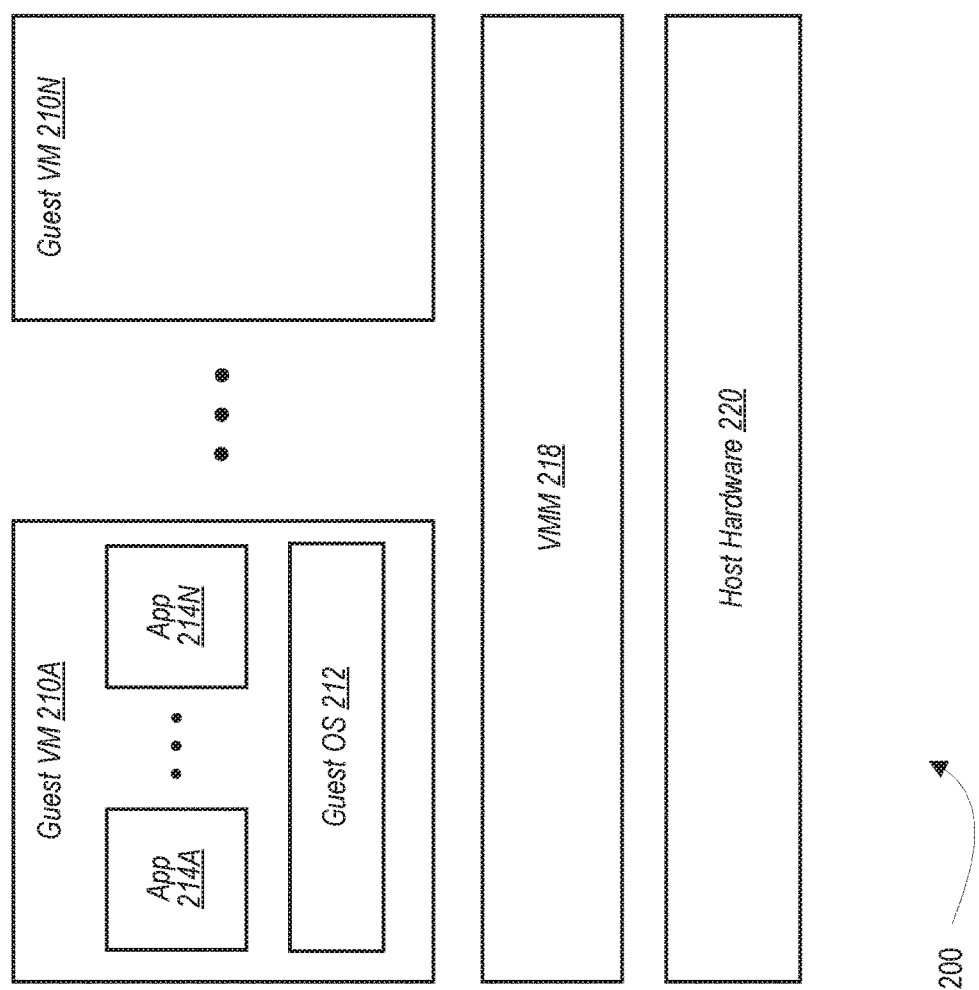
FIG. 2 is a block diagram of one embodiment of a computer system that implements virtualization.

Turning now to FIG. 2, a block diagram of one embodiment of a computer system 200 that implements virtualization is shown. In the embodiment of FIG. 2, multiple guest VMs 210A-210N are shown. Guest VM 210A includes a guest operating system (OS) 212 and one or more applications 214A-214N that run on the guest OS 212. The other guest VMs 210A-210N can include similar software. The guest VMs 210A-210N are managed by a virtual machine manager (VMM) 218. The VMM 218 and the guest VMs 210A-210N execute on host hardware 220, which can include the physical hardware included in the computing system 200. In one embodiment, host hardware 200 can include the various components shown in system 100 (of FIG. 1).

The host hardware 220 generally includes all of the hardware included in the computer system 200. In various embodiments, the host hardware 220 includes one or more processors, memory, peripheral devices, storage, and other circuitry used to connect together the preceding components. For example, personal computer (PC)-style systems can include a switch fabric coupling the processors, the memory, and a graphics device that uses an interface such as a peripheral component interface (PCI) Express Interface. Additionally, the switch fabric couples to a peripheral bus such as the PCI bus, to which various peripheral components are directly or indirectly coupled. In other embodiments, other circuitry can be used to link various hardware components. Any desired circuitry/host hardware structure can be used.

The VMM 218 is configured to provide the virtualization for each of the guest VMs 210A-210N. The VMM 218 is also responsible for scheduling the guest VMs 210A-210N for execution on the host hardware 220 (and more particularly, vCPUs within the guests if the guests include more than one vCPU). The VMM 218 is configured to use the hardware support provided in the host hardware 220 for virtualization. For example, the processors can provide hardware support for virtualization, including hardware to intercept events and exit the guest to the VMM 218 for notification purposes.

In some embodiments, the VMM 218 is implemented as a "thin" standalone software program that executes on the host hardware 220 and provides the virtualization for the guest VM 210A-210N. Such a VMM implementation can be referred to as a "hypervisor". In other embodiments, the VMM 218 is integrated into or execute on a host OS. In such embodiments, the VMM 218 relies on the host OS, including any drivers in the host OS, platform system management mode (SMM) code provided by the system BIOS, etc. Thus, the host OS components (and various lower-level components such as the platform SMM code) execute directly on the host hardware 220 and are not virtualized by the VMM 218. The VMM 218 and the host OS (if included) can together be referred to as the host, in one embodiment. Generally, the host includes any code that is in direct control of the host hardware 220 during use. For example, the host can be the VMM 218, the VMM 218 in conjunction with the host OS, or the host OS alone (e.g., in a non-virtualized environment).

In various embodiments, the VMM 218 can support full virtualization, paravirtualization, or both. Furthermore, in some embodiments, the VMM 218 concurrently executes guest that are paravirtualized and guest that are fully virtualized. With full virtualization, the guest VM 210A-210N is not aware that virtualization is occurring. Each guest VM 210A-210N has contiguous, zero based memory in its virtual machine, and the VMM 218 uses shadow page tables or nested page tables to control access to the host physical address space. The shadow page tables remap from guest virtual addresses to host physical addresses (effectively remapping the guest "physical address" assigned by memory management software in the guest VM 210A-210N to host physical address), while nested page tables receive the guest physical address as an input and map to the host physical address. Using the shadow page tables or nested page tables for each guest VM 210A-210N, the VMM 218 ensures that guests do not access other guests' physical memory in the host hardware 220.

With paravirtualization, guest VMs 210A-210N are at least partially VM-aware. Such guest VMs 210A-210N negotiate for memory pages with the VMM 218, and thus remapping guest physical addresses to host physical addresses is not required. In one embodiment, in paravirtualization, guest VMs 210A-210N are permitted to directly interact with peripheral devices in the host hardware 220. At any given time, a peripheral device is "owned" by a guest or guest VMs 210A-210N. In one implementation, for example, a peripheral device is mapped into a protection domain with one or more guest VMs 210A-210N that currently own that peripheral device. There is also a protection mechanism to prevent devices in a protection domain from reading/writing pages allocated to a guest in another protection domain.

Generally, a "guest VM" or a "guest" includes any one or more software programs that are to be virtualized for execution in the computer system 200. A guest VM includes at least some code that executes in privileged mode, and thus expects to have full control over the computer system on which it is executing. As mentioned previously, guest VM 210A is an example in which the guest VM includes a guest OS 212. The guest OS 212 can be any OS, such as Windows®, UNIX®, Linux®, etc. The guest VMs 210A-210N also execute non-OS privileged code.

It is noted that the letter "N" when used herein in reference numerals such as 210N is meant to generically indicate any number of elements bearing that reference numeral (e.g., any number of guest VMs 210A-210N, including one guest VM). Additionally, different reference numerals that use the letter "N" (e.g., 210N and 214N) are not intended to indicate equal numbers of the different elements are provided (e.g., the number of guest VMs 210A-210N can differ from the number of applications 214A-214N) unless otherwise noted.

Figure 3:
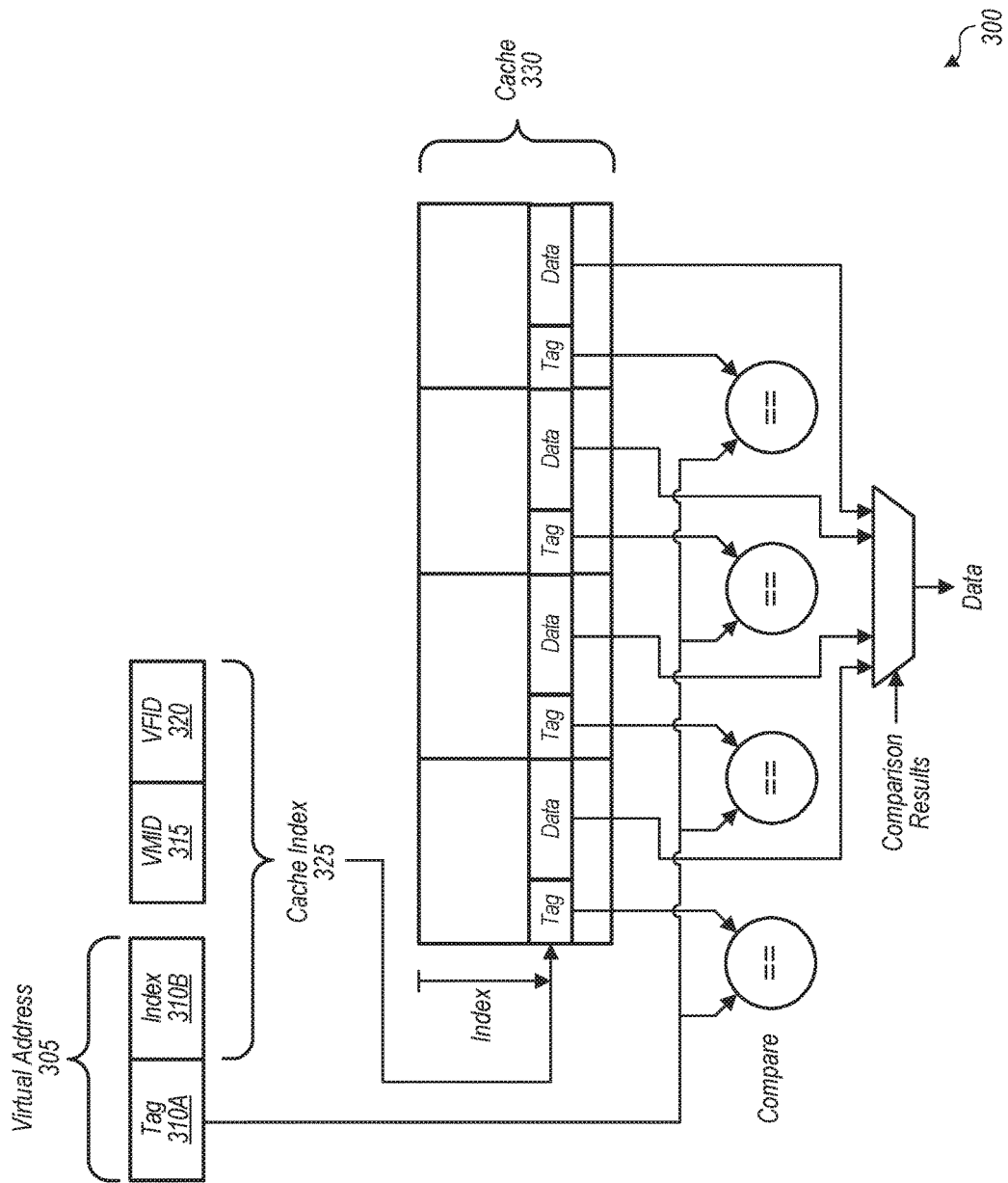
FIG. 3 is a block diagram of one embodiment of a translation lookaside buffer (TLB).

Referring now to FIG. 3, a block diagram of one embodiment of a translation lookaside buffer (TLB) 300 is shown. TLB 300 includes a cache 330 for storing virtual-to-physical address translations and control logic for accessing cache 330. In one embodiment, TLB 300 is a L1 TLB. In another embodiment, TLB 300 is a L2 TLB. For a given translation request, TLB 300 receives a virtual address 305, virtual memory identifier (VMID) 315, and virtual function identifier (VFID) 320. Virtual address 305 includes a tag portion 310A and index portion 310B. In some embodiments, cache 330 can be implemented with an N-way set associative structure. For example, cache 330 is shown as a 4-way set associative structure in FIG. 3. In other embodiments, other types of structures can be utilized to implement cache 330.

In one embodiment, the index 310B portion of virtual address, VMID 315, and VFID 320 are utilized as the cache index 325 to locate a given index of cache 330. In another embodiment, the cache index 325 comprises the index 310B and VMID 315. It is noted that different ways of combining the different values together to form cache index 325 can be utilized, depending on the embodiment. In one embodiment, the index 310B portion of virtual address, VMID 315, and VFID 320 are concatenated together to create cache index 325. In another embodiment, the index 310B portion of virtual address, VMID 315, and VFID 320 are hashed together utilizing a hash function to create cache index 325. In a further embodiment, a combination of concatenation and hashing of the index 310B portion of virtual address, VMID 315, and VFID 320 can be used to create cache index 325. The comparison logic will determine if a match with the tag has been detected for any of the cache entries at the location determined by index 325. By using the VMID 315 and/or VFID 320 to index into cache 330, multiple different guest VMs are able to share cache 330. This prevents TLB 300 from being flushed on a context switch between guest VMs.

Figure 4:
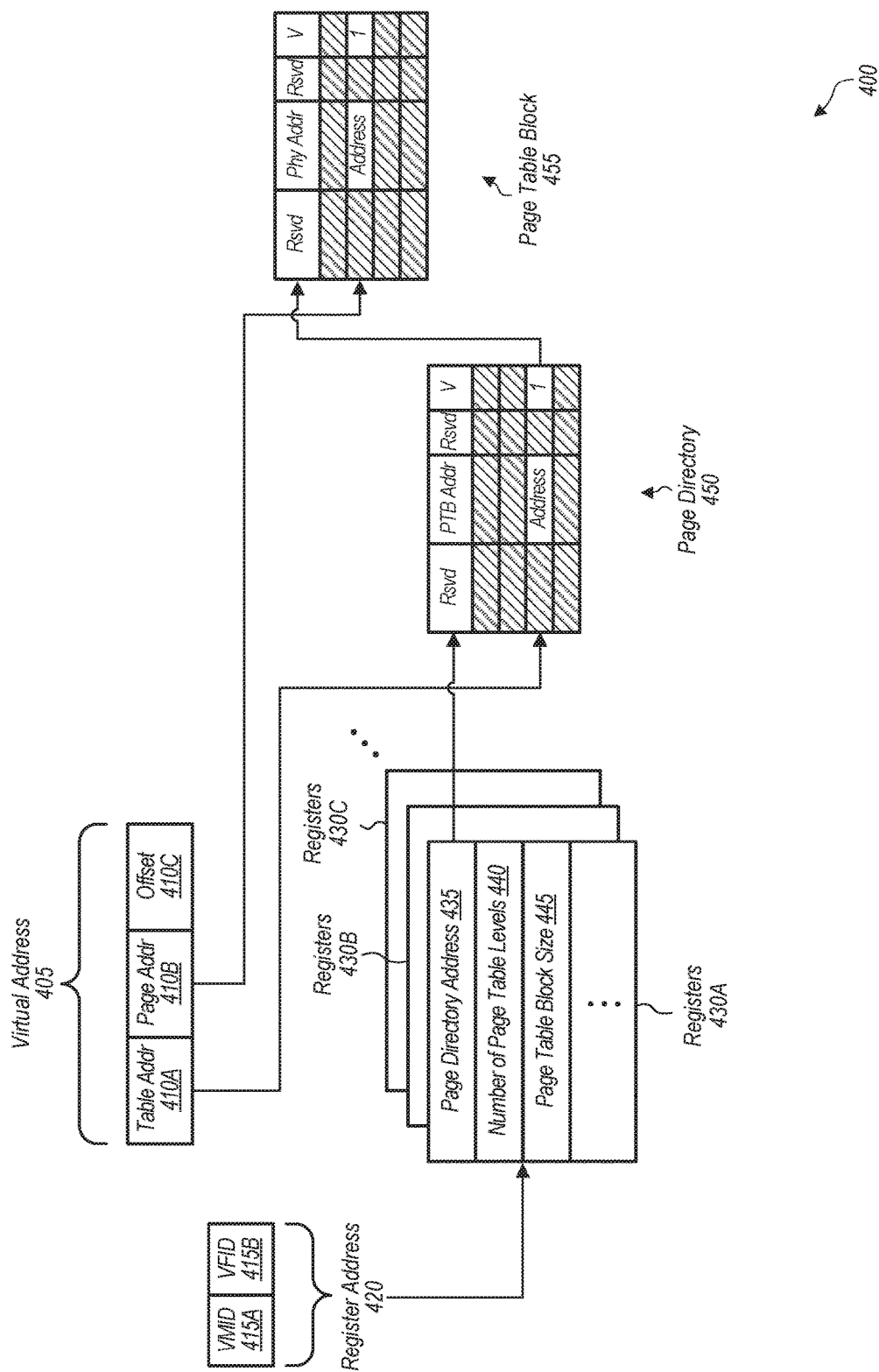
FIG. 4 is a block diagram of one embodiment of a page table structure.

Turning now to FIG. 4, a block diagram of one embodiment of a page table structure 400 is shown. In one embodiment, a computing system (e.g., system 100 of FIG. 1) translates virtual addresses into physical addresses for accessing a memory subsystem. Recently used virtual-to-physical translations are typically stored in one or more levels of TLBs. If a lookup for a given virtual address 405 misses in the TLB(s), then the translation request is sent to a table walker (not shown) to perform a table walk of page table structure 400. The translation request includes the virtual address 405 and the VMID 415A and VFID 415B.

In one embodiment, VMID 415A and VFID 415B are combined to create register address 420. In another embodiment, only VMID 415A is utilized to create register address 420. Register address 420 is utilized to locate one of the plurality of registers 430A-C storing parameters associated with different VMID and VFID combinations. Registers 430A-C are representative of any number of registers which can be utilized by the page table structure 400. As shown in FIG. 4, register 430A includes a page directory address 435, a number of page table levels 440, page table block size 445, and one or more other parameters. The other registers 430B-C also includes these parameters for other VMID and VFID combinations. The page directory address 435 is utilized to located a given page directory 450.

In one embodiment, the table address 410A of virtual address 405 is utilized to find a matching entry in the page directory 450 addressed by page directory address 435 of registers 430A. In one embodiment, the virtual address 405 is partitioned into three portions including a table address 410A, page address 410B, and offset 410C. In other embodiments, the virtual address 405 can be partitioned into other numbers of portions to facilitate other numbers of lookups to the page table structure 400. In one embodiment, the table address 410A is utilized to perform a lookup of page directory 450. The entry of page directory 450 pointed to by table address 410A includes at least a page table block (PTB) address field which points to a particular page table block 455.

In one embodiment, the page address 410B points to a given entry of the selected page table block 455. In one embodiment, each entry in page table block 455 includes at least a physical address field. This physical address field stores a page address which points to a page in memory (not shown). In another embodiment, each entry in page table block 455 points to another page table entry in a lower-level page table block (not shown). Accordingly, one or more additional lookups of page table structure 400 can be performed after the lookup to page table block 455.

Figure 5:
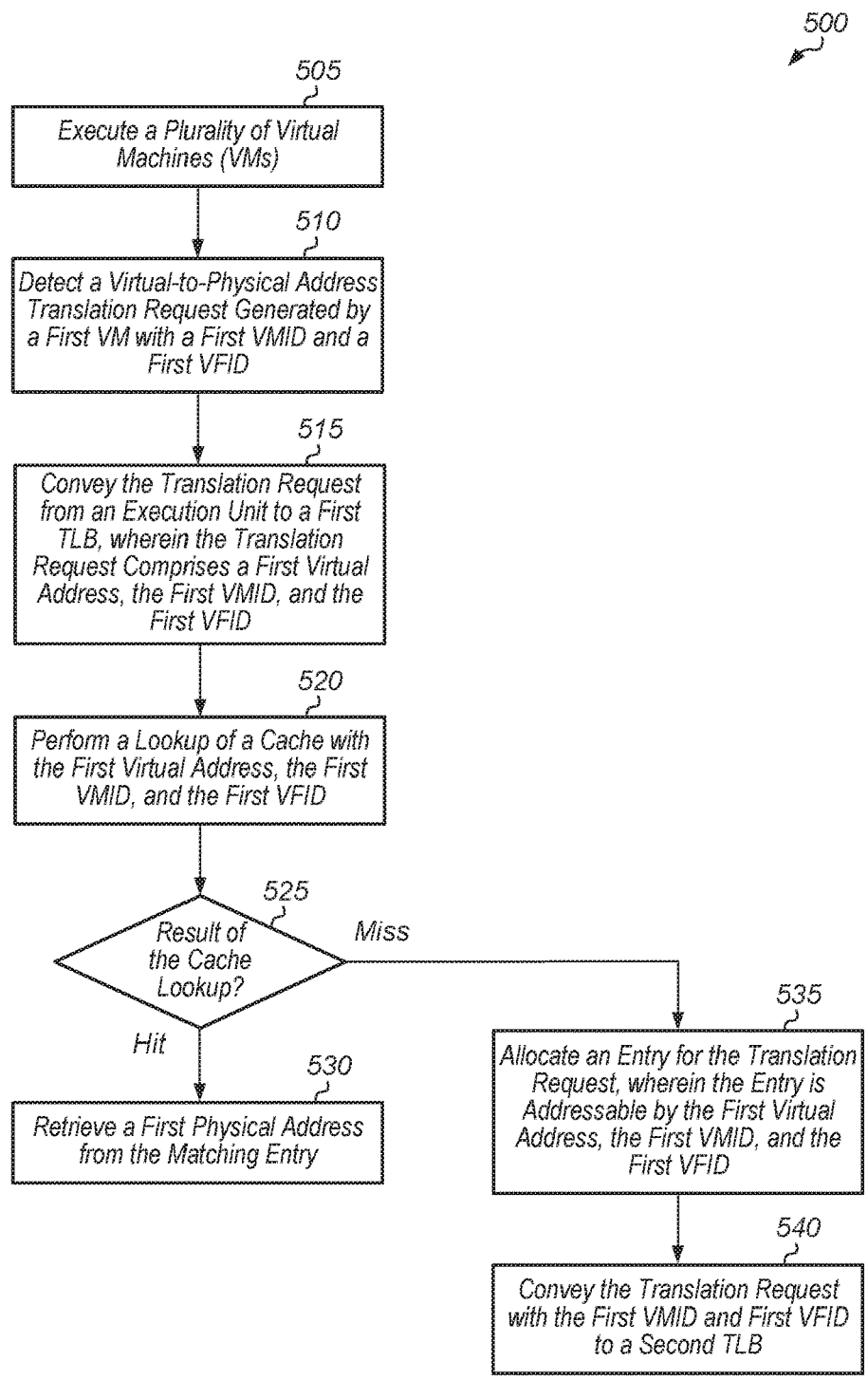
FIG. 5 is a generalized flow diagram illustrating one embodiment of a method for implementing a virtualized TLB.
Figure 6:
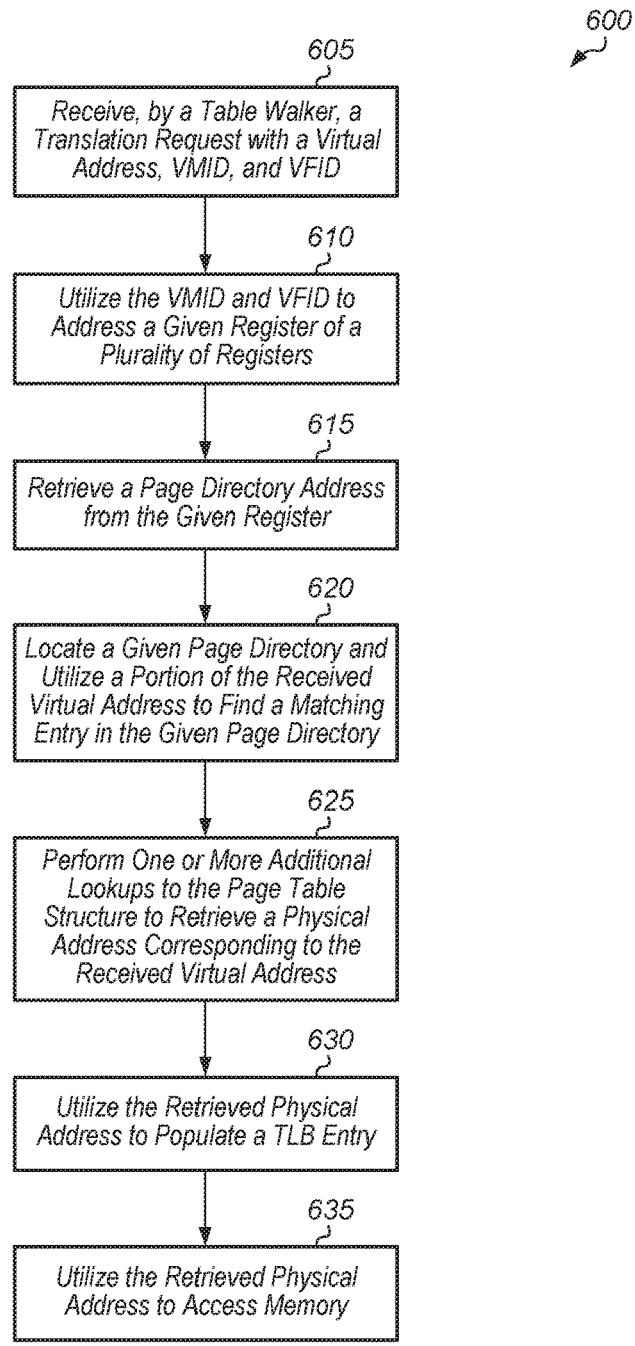
FIG. 6 is a generalized flow diagram illustrating one embodiment of a method for performing a table walk of a page table structure.

Referring now to FIG. 5, one embodiment of a method 500 for implementing a virtualized TLB is shown. For purposes of discussion, the steps in this embodiment and those of FIG. 6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A computing system (e.g., system 100 of FIG. 1) executes a plurality of virtual machines (VMs) (block 505). In one embodiment, the computing system includes at least an execution unit and a first TLB. The computing system also includes any number of other components. The system detects a virtual-to-physical address translation request generated by a first virtual machine with a first virtual memory identifier (VMID) and a first virtual function identifier (VFID) (block 510). The system conveys the translation request from an execution unit to a first TLB, wherein the translation request comprises a first virtual address, the first VMID, and the first VFID (block 515). The first TLB performs a lookup of its cache with the portion of the first virtual address, the first VMID, and the first VFID (block 520). In another embodiment, the lookup of the cache is performed with the portion of the first virtual address and the first VMID.

If the lookup of the cache results in a hit (conditional block 525, "hit" leg), then a first physical address is retrieved from the matching entry (block 530). If the lookup of the cache results in a miss (conditional block 525, "miss" leg), then the first TLB allocates an entry for the translation request, wherein the entry is addressable by the first virtual address and the first VMID, and the first VFID (block 535). Also, the first TLB is configured to convey the translation request with the first VMID and the first VFID to a second TLB (block 540). After block 540, method 500 ends. It is noted that the second TLB can perform a lookup of its cache using the first virtual address, the first VMID, and the first VFID in response to receiving the translation request from the first TLB.

Turning now to FIG. 6, one embodiment of a method 600 for performing a table walk of a page table structure is shown. A table walker receives a translation request with a virtual address, VMID, and VFID (block 605). The table walker utilizes the VMID and VFID to address a given register of a plurality of registers (block 610). The table walker retrieves a page directory address from the given register (block 615). The table walker can also retrieve one or more additional parameters (e.g., number of page table levels, page table block size) from the given register.

The table walker locates a given page directory and utilizes a portion of the received virtual address to find a matching entry in the given page directory (block 620). Then, the table walker performs one or more additional lookups to the page table structure to retrieve a physical address corresponding to the received virtual address (block 625). Next, the retrieved physical address is utilized to populate a TLB entry (block 630). Also, the retrieved physical address is utilized to access memory (block 635). After block 635, method 600 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations.

Numerous variations and modifications will become apparent to those skilled in the art once the above disclosure is fully appreciated. It is intended that the following claims be interpreted to embrace all such variations and modifications.

What is claimed is:

1. A system comprising:
   an execution unit; and
   a first translation lookaside buffer (TLB), wherein the first TLB comprises a cache of entries storing virtual-to-physical address translations;
   wherein the system comprises circuitry configured to:
      execute a plurality of virtual machines;
      detect a virtual-to-physical address translation request generated by a first virtual machine with a first virtual memory identifier (VMID);
      convey a translation request from the execution unit to the first TLB, wherein the translation request conveyed by the execution unit comprises a first virtual address, the first VMID, and a first virtual function identifier (VFID); and
      perform a lookup of the cache with a portion of the first virtual address and the first VMID.

2. The system as recited in claim 1, wherein the system is further configured to perform the lookup of the cache with at least the first VFID.

3. The system as recited in claim 1, wherein the system is further configured to retrieve a first physical address from a first entry responsive to determining the lookup matches on the first entry based on the portion of the first virtual address and the first VMID.

4. The system as recited in claim 3, wherein the system further comprises a second TLB, and wherein the first TLB is further configured to convey the first virtual address and the first VMID to the second TLB responsive to determining the lookup missed in the cache.

5. The system as recited in claim 4, wherein responsive to determining the lookup missed in the cache, the first TLB is configured to allocate, in the cache, a second entry for the translation request, wherein the second entry is addressable by the portion of the first virtual address and the first VMID.

6. The system as recited in claim 1, wherein the system further comprises a table walker, wherein the table walker is configured to identify a particular page table register based on the first VMID.

7. A method comprising:
   executing a plurality of virtual machines;
   detecting a virtual-to-physical address translation request generated by a first virtual machine with a first virtual memory identifier (VMID);
   conveying a translation request from an execution unit to a first TLB, wherein the translation request conveyed by the execution unit comprises a first virtual address, the first VMID, and a first virtual function identifier (VFID); and
   performing a lookup of the cache with a portion of the first virtual address and the first VMID).

8. The method as recited in claim 7, further comprising performing the lookup of the cache with at least the first VFID.

9. The method as recited in claim 7, further comprising retrieve a first physical address from a first entry responsive to determining the lookup matches on the first entry based on the portion of the first virtual address and the first VMID.

10. The method as recited in claim 9, further comprising conveying the first virtual address and the first VMID to a second TLB responsive to determining the lookup missed in the cache.

11. The method as recited in claim 9, wherein responsive to determining the lookup missed in the cache, the method further comprising allocating, in the cache, a second entry for the translation request, wherein the second entry is addressable by the portion of the first virtual address and the first VMID.

12. The method as recited in claim 7, further comprising identifying, by a table walker, a particular page table register based on the first VMID.

13. A translation lookaside buffer (TLB) comprising:
    a cache; and
    control logic;
    wherein the TLB comprises circuitry configured to:
       receive a translation request from an execution unit, wherein the translation request conveyed by the execution unit comprises a first virtual address, a first virtual memory identifier (VMID) and a first virtual function identifier (VFID); and
       perform a lookup of the cache with a portion of the first virtual address and the first VMID.

14. The TLB as recited in claim 13, wherein the TLB is configured to perform the lookup of the cache with at least the first VFID.

15. The TLB as recited in claim 13, wherein responsive to determining that the first entry includes the first indication, the TLB is configured to retrieve a first physical address from a first entry responsive to determining the lookup matches on the first entry based on the portion of the first virtual address and the first VMID.

16. The TLB as recited in claim 15, wherein the TLB is further configured to convey the first virtual address and the first VMID to the second TLB responsive to determining the lookup missed in the cache.

17. The TLB as recited in claim 16, wherein responsive to determining the lookup missed in the cache, the TLB is configured to allocate, in the cache, a second entry for the translation request, wherein the second entry is addressable by the portion of the first virtual address and the first VMID.

* * * * *

UNITED STATES PATENT AND TRADEMARK OFFICE
CERTIFICATE OF CORRECTION

PATENT NO. : 10,339,068 B2
APPLICATION NO. : 15/495707
DATED : July 2, 2019
INVENTOR(S) : Smith et al.

Page 1 of 1

It is certified that error appears in the above-identified patent and that said Letters Patent is hereby corrected as shown below:

In the Claims

Column 10, Claim 7, Line 2, please delete "first VIVID)." and substitute -- first VMID. --.

Column 10, Claim 13, Line 31, please delete "(VMID)" and substitute -- (VMID), --.

Signed and Sealed this
Twenty-ninth Day of October, 2019

Andrei Iancu
*Director of the United States Patent and Trademark Office*